US 12,508,413 B2

(12) United States Patent
Shafiq et al.

(10) Patent No.: US 12,508,413 B2
(45) Date of Patent: Dec. 30, 2025

(54) CONNECTOR COUPLING ASSEMBLY (71) Applicant: CAREFUSION 303, INC., San Diego, CA (US)

(72) Inventors: Mohamed Shafiq, Bangalore (IN); Kanjimpuredathil Muralikrishna Menon, Bangalore (IN)

(73) Assignee: CAREFUSION 303, INC., San Diego, CA (US)

( * ) Notice: Subject to any disclaimer, the term of this patent is extended or adjusted under 35 U.S.C. 154(b) by 295 days.

(21) Appl. No.: 18/470,041

(22) Filed: Sep. 19, 2023

(65) Prior Publication Data

US 2024/0157110 A1    May 16, 2024

Related U.S. Application Data (60) Provisional application No. 63/424,587, filed on Nov. 11, 2022.

(51) Int. Cl.
*A61M 39/10*    (2006.01)
*G04B 47/00*    (2006.01)
*G04F 10/00*    (2006.01)

(52) U.S. Cl.
CPC ......... *A61M 39/1011* (2013.01); *G04B 47/00* (2013.01); *G04F 10/00* (2013.01); *A61M 2039/1066* (2013.01)

(58) Field of Classification Search
CPC ...... A61M 39/1011; A61M 2039/1066; A61M 2039/1005; A61M 2039/1022; A61M 2039/1044; A61M 39/10; A61M 5/14; A61M 5/158; A61M 39/26; A61M 2039/1061; G04B 47/00; G04F 10/00
See application file for complete search history.

(56) References Cited

U.S. PATENT DOCUMENTS 8,795,256 B1    8/2014   Smith
2015/0265828 A1  9/2015   Colman
(Continued)

FOREIGN PATENT DOCUMENTS

EP    3845267 A1    7/2021

OTHER PUBLICATIONS

International Search Report and Written Opinion for Application No. PCT/US2023/033972, dated Mar. 1, 2024, 14 pages.
(Continued)

*Primary Examiner* — Edwin A. Leon
(74) *Attorney, Agent, or Firm* — MASCHOFF BRENNAN (57) ABSTRACT

A connector assembly may include a cover defining a cavity, a luer portion extending through an open end of the cover, a proximal connector disposed at least partially in the cavity of the cover, a pusher mounted on the proximal connector, a distal connector at least partially disposed in the cover, and a stopwatch mounted on the cover and including at least one contact. The pusher may include a body portion and first and second pusher legs extending from the body portion. When the distal connector is coupled to a mating connector, the stopwatch may abut the first pusher leg such that the at least one contact is recessed within the stopwatch. When a force applied to the proximal connector exceeds a predetermined threshold the stopwatch may be separated from the first pusher leg and the at least one contact may extend proximally to activate a timer of the stopwatch.

20 Claims, 7 Drawing Sheets

(56) References Cited

U.S. PATENT DOCUMENTS

| | | |
|---|---|---|
| 2016/0000363 A1 | 1/2016 | Jones et al. |
| 2017/0014581 A1 | 1/2017 | Larson |
| 2017/0036007 A1 | 2/2017 | Hallisey |
| 2017/0119969 A1* | 5/2017 | McCullough ....... A61M 5/3243 |
| 2020/0206439 A1* | 7/2020 | Klurfeld ................. A24F 40/40 |
| 2022/0265922 A1* | 8/2022 | Yamin ................... A61M 5/162 |

OTHER PUBLICATIONS

Invitation to Pay Additional Fees and Partial International Search Report for Application No. PCT/US2023/033972, dated Jan. 9, 2024, 8 pages.

* cited by examiner

CONNECTOR COUPLING ASSEMBLY

CROSS REFERENCE TO RELATED APPLICATION PATENT

This application claims priority under 35 U.S.C. § 119 to U.S. Provisional Patent Application No. 63/424,587 filed on Nov. 11, 2022, the disclosure of which is incorporated herein by reference in its entirety.

FIELD OF THE INVENTION

The present disclosure generally relates to connectors, and, in particular, to self-sealing connectors configured to prevent accidental disconnection of a catheter from an access site.

BACKGROUND

Medical treatments often include the infusion of a medical fluid (e.g., a saline solution or a liquid medication) to patients using an intravenous (IV) catheter that is connected through an arrangement of flexible tubing and fittings, commonly referred to as an "IV set," to a source of fluid, for example, an IV bag. Often, tubing or catheters are coupled or secured to each other to allow fluid communication between various portions of tubing or catheters.

In some applications, such tubing or catheters may become dislodged due to improper securement and/or when the coupling is subject to forces greater than what the coupling is designed to withstand.

SUMMARY

In some embodiments described herein, connector assemblies include a cover having an inner surface defining a cavity terminating in an open end of the cover, and a luer portion extending in the cavity and through the open end; a proximal connector disposed at least partially in the cavity of the cover, and defining an inlet port and having an inner surface defining a cavity of the proximal connector; a pusher mounted on the proximal connector and comprising: a body portion including an outer surface, a proximal end, and a distal end; first and second pusher legs extending radially outward from opposing sides of the body portion at the proximal end of the body portion; a distal connector at least partially disposed in the cavity of the cover; and a stopwatch mounted on the outer surface of the cover and including at least one contact, wherein: when the distal connector is coupled to a mating connector, the stopwatch abuts the first pusher leg such that the at least one contact is recessed within the stopwatch; and when a force applied to the proximal connector exceeds a predetermined threshold causing the pusher to translate proximally relative to the distal connector, the stopwatch is separated from the first pusher leg and the at least one contact extends proximally to activate a timer of the stopwatch.

Some embodiments describe connector assemblies that include a cover having a proximal end, an outer surface, an inner surface defining a cavity terminating in an open end of the cover, and a luer portion extending in the cavity and through the open end; a proximal connector disposed at least partially in the cavity of the cover, and defining an inlet port and having an inner surface defining a cavity of the proximal connector, wherein a fluid path extends from the inlet port through the luer portion to an outlet port of the luer portion; a pusher mounted on the proximal connector and comprising: a body portion including an outer surface, an inner surface defining a cavity of the pusher, a proximal end, and a distal end comprising a plurality of protrusions extending radially outward from the body portion; and first and second pusher legs extending radially outward from opposing sides of the body portion at the proximal end of the body portion; and a distal connector comprising first and second arms disposed in the cavity of the cover and extending through the open end of the cover, the first and second arms pivotably coupled to each other and slidably coupled to the pusher, a proximal end portion of each of the first and second arms comprising a protrusion, wherein when a force applied to the proximal connector exceeds a predetermined threshold, the plurality of protrusions of the body portion disengage the protrusions of the first and second arms to allow the pusher to translate proximally relative to the distal connector.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The disclosed connector assembly incorporates a cover having an inner surface defining a cavity, a luer portion extending in the cavity and through an open end of the cover, a proximal connector disposed at least partially in the cavity of the cover, a pusher mounted on the proximal connector, a distal connector at least partially disposed in the cavity of the cover and including first and second arms extending through the open end of the cover, and a stopwatch mounted on the outer surface of the cover and including at least one contact. A fluid path may extend from the inlet port through the luer portion to an outlet port of the luer portion. The proximal connector may define an inlet port and have an inner surface defining a cavity of the proximal connector. The pusher may include a body portion and first and second pusher legs extending radially outward from opposing sides of the body portion at a proximal end of the body portion.

In some embodiments, the distal connector may include first and second arms extending though the open end of the cover, pivotably coupled to each other and slidably coupled to the pusher. When the distal connector is coupled to a mating connector, e.g., a needleless connector, the stopwatch may abut the first pusher leg such that the at least one contact is recessed within the stopwatch. When a force applied to the proximal connector exceeds the predetermined threshold causing the pusher to translate proximally relative to the distal connector, the stopwatch may be separated from the first pusher leg and the at least one contact may extend or protrude proximally to activate a timer of the stopwatch. For example, when the pusher translates proximally relative to the distal connector, protrusions of the first and second arms of the distal connector may slide distally and become fully disengaged from the pusher, thereby allowing the first and second arms to pivot radially outward and release the mating connector. The mating connector may then be swabbed or otherwise disinfected, and the connector assembly may then be replace with a new sterile connector assembly.

The connector assembly of the various embodiments described herein—by incorporating a stopwatch which is activated upon releasing or otherwise decoupling from the mating connector—is advantageous over conventional couplers and related infusion systems in that the stopwatch allows the clinician or other medical professional do determine the exact moment/timing at which the disconnection occurred. Further, the connector assembly of the various embodiments described herein—by releasing or otherwise decoupling from the mating connector, versus conventional couplers and related infusion systems in which the pullout force exceeding the predetermined threshold would result in dislodgement or decoupling of the actual catheter—is thereby advantageous in preventing the dislodgment of the catheter 50, potential resulting bleeding, medication leaks, as well as excessive ringing of alarms to alert a clinician of the dislodgement.

In accordance with various embodiments, the connector assembly may further include a spring member mounted in the cavity of the proximal connector, and a post disposed in the luer portion and extending longitudinally in the fluid path from a proximal end of the spring member toward the outlet port of the luer portion. When the mating connector is coupled to the distal connector, the mating connector may exert a force to urge the plurality of arms proximally, compress the spring member, and displace the closed end of the post away from the outlet port of the luer portion Upon disengagement of the first and second arms from the pusher, the compressed spring expands and exerts a force on the post to displace the closed end of the post towards the outlet port of the luer portion to seal the outlet port, thereby closing the fluid path and advantageously preventing microbial ingress into the fluid path. Further advantageously, the sealed outlet port may prevent the medical fluid, e.g., IV fluid from further exiting or otherwise spilling out of the fluid path via the outlet port of the luer portion upon the disconnection of the mating connector.

Since the first and second arms of the distal connector are advantageously designed to release the mating needleless connector when a pull force exceeding the threshold pull force is applied, both the connector assembly (for example, but not limited to a Texium valve) and the mating connector (for example, but not limited to a Smartsite valve) may automatically shut off at separation thereby preventing leakage or spillage of medical fluids upon accidental disconnection by higher pullout forces exceeding the predetermined threshold force.

The detailed description set forth below is intended as a description of various configurations of the subject technology and is not intended to represent the only configurations in which the subject technology may be practiced. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding. Reference numbers may have letter suffixes appended to indicate separate instances of a common element while being referred to generically by the same number without a suffix letter.

While the following description is directed to the connection of medical fittings for the administration of medical fluid using the disclosed coupler, it is to be understood that this description is only an example of usage and does not limit the scope of the claims. Various aspects of the disclosed coupler may be used in any application where it is desirable to secure the connection of various tubing and fittings.

The disclosed coupler overcomes several challenges discovered with respect to certain conventional couplers. One challenge with certain conventional couplers is that certain conventional couplers may be improperly secured. Further, during use, certain conventional couplers may be designed to release or dislodge in response to relatively low pullout forces. For example, certain conventional couplers may release in response to pullout forces experienced during patients rolling over in bed, patients catching tubing or lines on bed rails, moving patients to a different bed, fidgeting by pediatric patients, and/or disoriented adult patients pulling out their lines. Indeed, the Association for Vascular Access (AVA) Annual Scientific Meeting in 2017 reported a 10% dislodgement rate for 1,000 patients fitted with peripheral IV catheters, translating to approximately 33 million dislodgements per year in the U.S. alone. Because the accidental or unintentional dislodgement of tubing, catheters, or fittings may interrupt the administration of medical fluids, the use of certain conventional couplers is undesirable.

Therefore, in accordance with the present disclosure, it is advantageous to provide couplers and coupler/connector assemblies as described herein that allows for improved securement of fittings or connectors. The disclosed couplers and coupler/connector assemblies are structured as described herein so as to permit the secure retention of the connectors, while allowing intentional removal of the connector as required.

Figure 1:
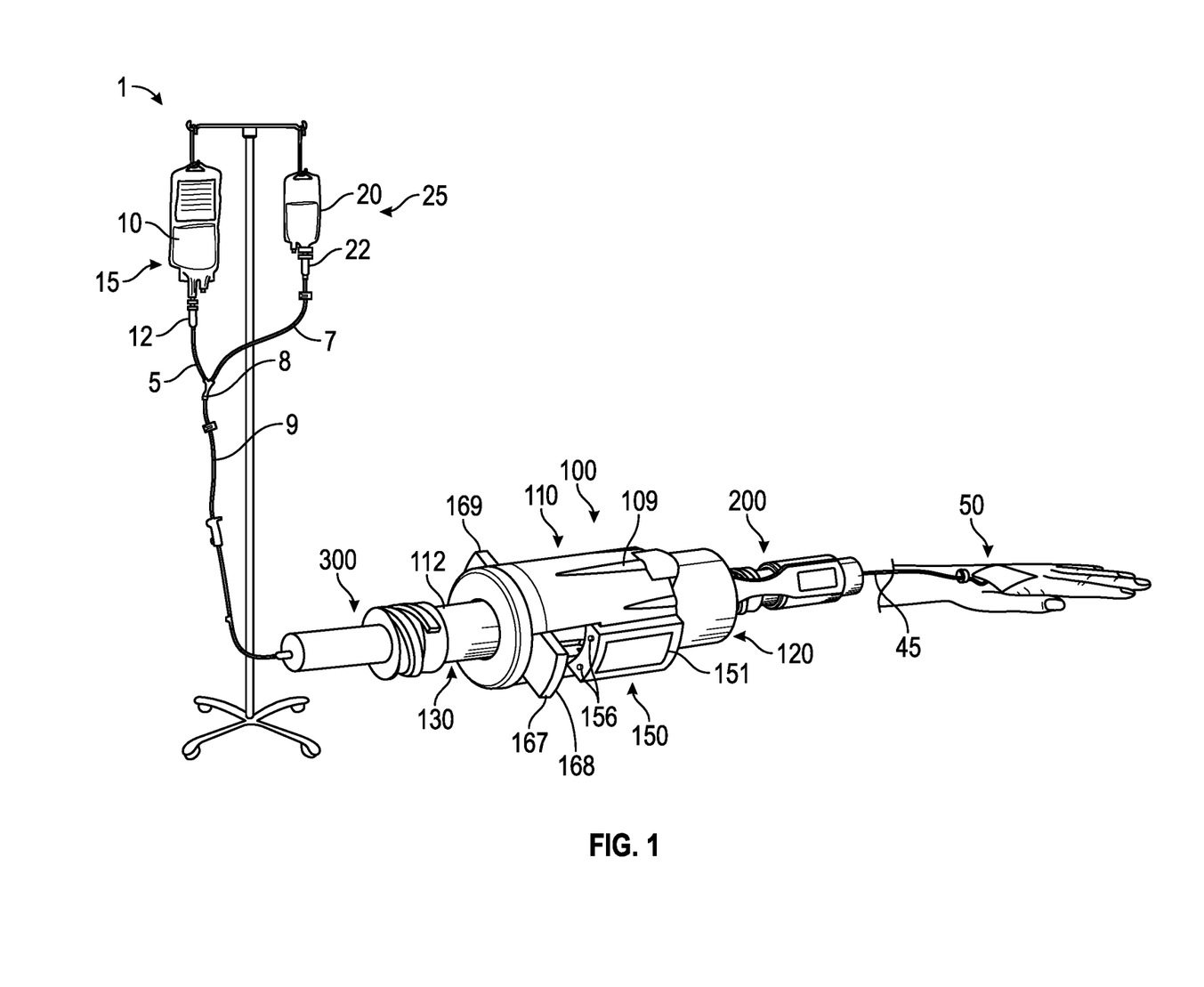
FIG. 1 illustrates an IV extension set including a connector assembly fluidly coupled to a catheter, in accordance with some embodiments of the present disclosure.
Figure 2:
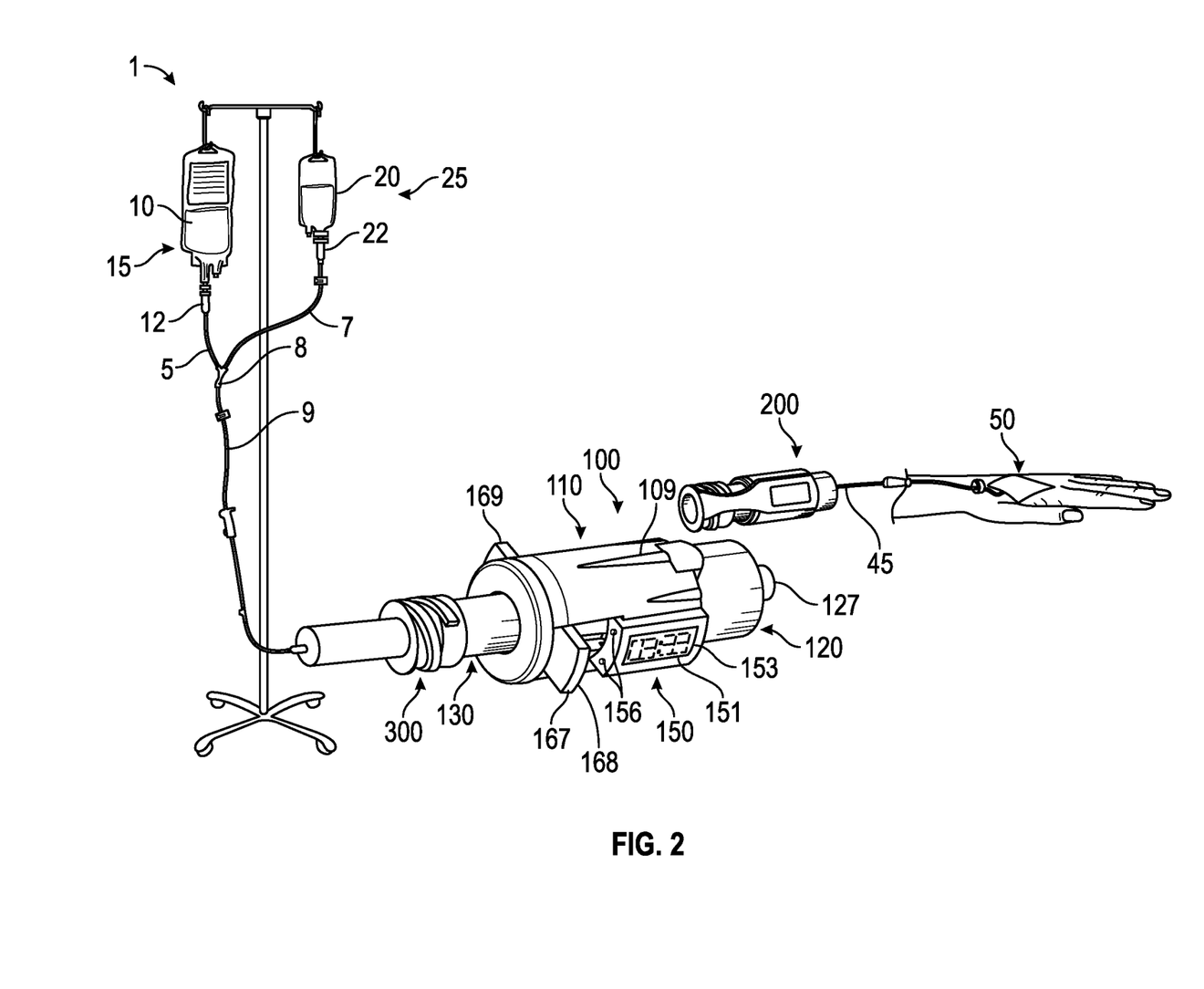
FIG. 2 illustrates an IV extension set including the connector assembly of FIG. 1 detached from the catheter due to a proximally-directed force exceeding the predetermined threshold being applied, in accordance with some embodiments of the present disclosure.

FIG. 1 illustrates an IV extension set including a connector assembly 100 fluidly coupled to a catheter, in accordance with some embodiments of the present disclosure. FIG. 2 illustrates an IV extension set 1 including the connector assembly 100 of FIG. 1 detached from the catheter due to a proximally-directed force exceeding the predetermined threshold being applied, in accordance with some embodiments of the present disclosure. As depicted, IV set 1 may include a primary fluid system 15 and a secondary fluid system 25. An IV pump (not shown) receives fluid from primary fluid system 15 and secondary fluid system 25 via a primary IV fluid line 5 and a secondary IV fluid line 7 and may control and dispense the fluids therefrom to a patient via catheter 50. In some embodiments, primary fluid system 15 may include a primary fluid source or container such as a primary intravenous (IV) fluid bag 10, which may include or contain a first medical fluid, e.g., saline solution or other medicinal fluid or drug to be administered to the patient via catheter 50. In accordance with some embodiments, the secondary fluid system 25 may include a secondary fluid source or container such as a secondary IV fluid bag 20, which may contain a second medical fluid, e.g., drugs or other secondary fluid to be supplied to the patient for treatment. In some embodiments, the second medical fluid may be different from the first medical fluid. However, the various embodiments of the present disclosure are not limited to the aforementioned configuration. In other embodiments, the first and second medical fluids may be the same.

According to various embodiments of the present disclosure, as illustrated in FIGS. 1 and 2, primary IV fluid bag 10, which holds a primary fluid may be positioned at a lower axial position or height that the secondary IV fluid bag 20. For example, the primary IV fluid bag 10 may be hung on a suspension system or hanger and then the secondary IV fluid bag 20 may be hung above the primary IV fluid bag and may be coupled to the secondary fluid line 7, which is connected to the primary line 5 via y-port adapter 8. As depicted, primary IV fluid line 5 carries the primary fluid from a drip chamber 12 into an outlet fluid line 9 via the y-port adapter 8, and secondary IV fluid line 7 may carry the secondary fluid from a drip chamber 12 into the outlet fluid line 9 via the y-port adapter 8. Accordingly, the y-port adapter 8 may fluidly couple or communicate the primary IV fluid line 5 and the secondary IV fluid line 7 with an outlet fluid line 9 in order to allow fluid to flow from primary fluid bag 10 and/or secondary fluid bag 20 to the connector assembly 100 via the outlet fluid line 9.

As depicted, the detachable connector assembly 100 may be configured to selectively deliver the primary and/or secondary medical fluid to a catheter 50 via a mating connector 200 (e.g., a needleless connector 200). The IV extension set 1 may further include a mating luer 300 (e.g., a male luer connector 300) for coupling the connector assembly 100 to the tubing/outlet fluid line 9. As shall be described in further detail below with respect to at least FIGS. 4 and 7-9, a fluid path 138 may be defined from the lumen of the fluid line 9, through a lumen of the mating luer 300, the connector assembly 100, and the needleless connector 200. The first and/or second medical fluid may thus be delivered to the catheter 50 via the fluid path 138 and extension tubing 45.

Figures 3, 4:
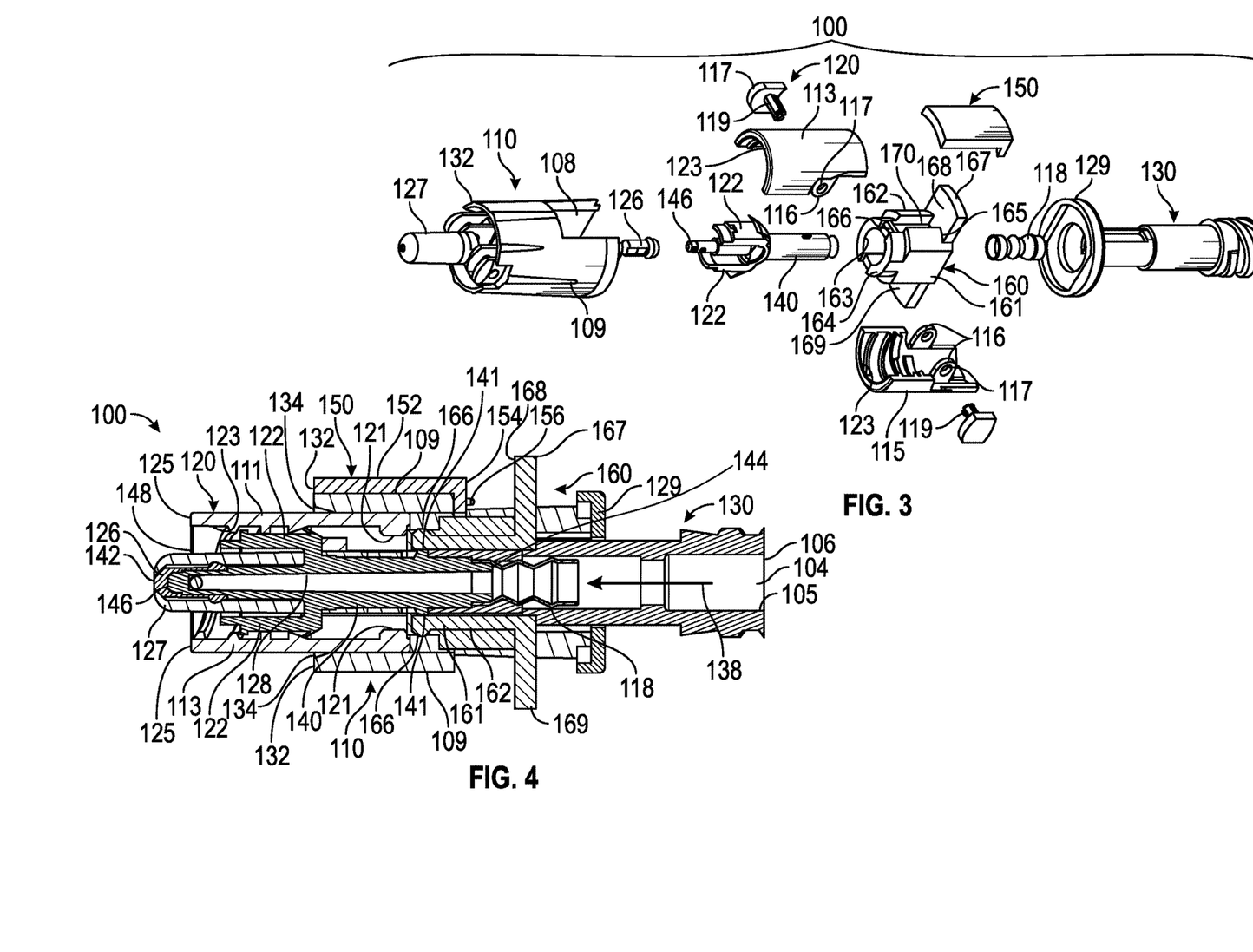
FIG. 3 illustrates an exploded perspective view of a connector assembly, in accordance with some embodiments of the present disclosure.
FIG. 4 illustrates a cross-sectional assembled view of the connector assembly of FIG. 3, in accordance with some embodiments of the present disclosure.

FIG. 3 illustrates an exploded perspective view of the connector assembly 100, in accordance with some embodiments of the present disclosure. FIG. 4 illustrates a cross-sectional assembled view of the connector assembly 100 of FIG. 3, in accordance with some embodiments of the present disclosure. As illustrated in FIGS. 3 and 4, with continued reference to FIGS. 1 and 2, the connector assembly 100 may include a cover 110 having an outer surface 109, an inner surface 108 defining a cavity 134 terminating in an open end 132 of the cover 110, and a luer portion 127 extending in the cavity 134 and through the open end 132 of the cover 110. The connector assembly 100 may further include a proximal connector 130 disposed at least partially in the cavity 134 of the cover 110. The proximal connector 130 may define an inlet port 106 and may have an inner surface 105 defining a cavity 104 of the proximal connector 130. A spring member 118 may be mounted in the cavity 104 of the proximal connector 130

In some embodiments, the fluid path 138 may extend from the inlet port 106 through the luer portion 127, to an outlet port 142 of the luer portion 127. A post 140 may be disposed in the luer portion 127 extending longitudinally in the fluid path 128 from a proximal end of the spring member 118 toward the outlet port 142 of the luer portion 127. In some embodiments, the post 140 may define a lumen 128 and may have an open end 144, an opposing closed end 146, and a passage 148 through a sidewall between the open end 144 and the closed end 146. In some embodiments, the post 140 may include a seal 126 on the outside surface of the closed end 146 to prevent fluid flow through the outlet port 142 of the luer portion 127. As depicted, the post 140 may have a plurality of arms 122 extending from the post 140 and along an exterior of the luer portion 127 toward the outlet port 142. The post 140 may further include a pair of protrusions 141 extending radially outward from an outer surface of opposing sides of the post 140.

In some embodiments, the connector assembly 100 may further include a pusher 160 mounted on the proximal connector 130. As depicted, the pusher 160 may include a body portion 161 including an outer surface 162, a proximal end 165, and a distal end 16 The pusher 160 may further include first and second pusher legs 167 and 169 extending radially outward from opposing sides of the body portion 161 at the proximal end 165 of the body portion 161. In some embodiments, the body portion 161 of the pusher 160 may further include a plurality of protrusions 166 extending radially outward from the distal end 164 of the body portion 161. In some embodiments, the outer surface 162 of the body portion 161 of the pusher 160 may have a plurality of slots 170 recessed at least partially therein. As depicted, each slot 170 may extend distally from a respective one of the pusher legs 167 and 169 to a respective one of the protrusions 166 at the distal end 164 of the body portion 161. For example, a first slot 170 may extend distally from the first pusher leg 167 to an upper protrusion 166, and a second slot 170 may extend distally from the second pusher leg 169 to a lower protrusion 166.

According to various embodiments of the present disclosure, the connector assembly 100 may further include a distal connector 120 at least partially disposed in the cavity 134 of the cover 110 and including first and second arms 113 and 115 disposed in the cavity 134 of the cover 110 and extending through the open end 132 of the cover 110. As depicted, the distal connector 120 may have an inner surface 123, and a proximal end portion of each of the first and second arms 113 and 115 may have a protrusion 121 extending radially inward from the inner surface 123. In some embodiments, the first and second arms 113 and 115 may be pivotably coupled to each other. For example, in some embodiments, the first and second arms 113 and 115 may each include a pair of hinge portions 116 having coupling apertures 117. The hinge portions 116 and respective coupling apertures 117 of the first and second arms 113 and 115 may be aligned coaxially such that pivot pins 119 may be inserted into the aligned coupling apertures 117 at opposing sides of the first and second arms 113 and 115. Accordingly, the pair of hinge portions 116 of the first arm 113 may be rotatably coupled to the pair of hinge portions 116 of the second arm 115, thereby pivotally coupling the first and second arms 113 and 115 of the distal connector 120 to each other.

In some embodiments, the first and second arms 113 and 115 of the distal connector 120 may be slidably coupled to the pusher 160. For example, in a coupled configuration of the distal connector 120 and the pusher 160 (illustrated at least in FIG. 7), the protrusions 121 of the first and second arms 113 and 115 may be supported, seated, or otherwise disposed in the corresponding slots 170 of the pusher 160. As depicted, in the coupled configuration of the distal connector 120 and the pusher 160, the protrusions 121 of the first and second arms 113 and 115 may be positioned in the slots 170 such that they abut, or otherwise contact and engage the protrusions 166 of the pusher 160. As shall be described in further detail below, the aforementioned configuration is advantageous in preventing distal motion of the distal connector relative to the pusher when a proximally-directed force less than or equal to a predetermined threshold is applied to the proximal connector.

Figure 5:
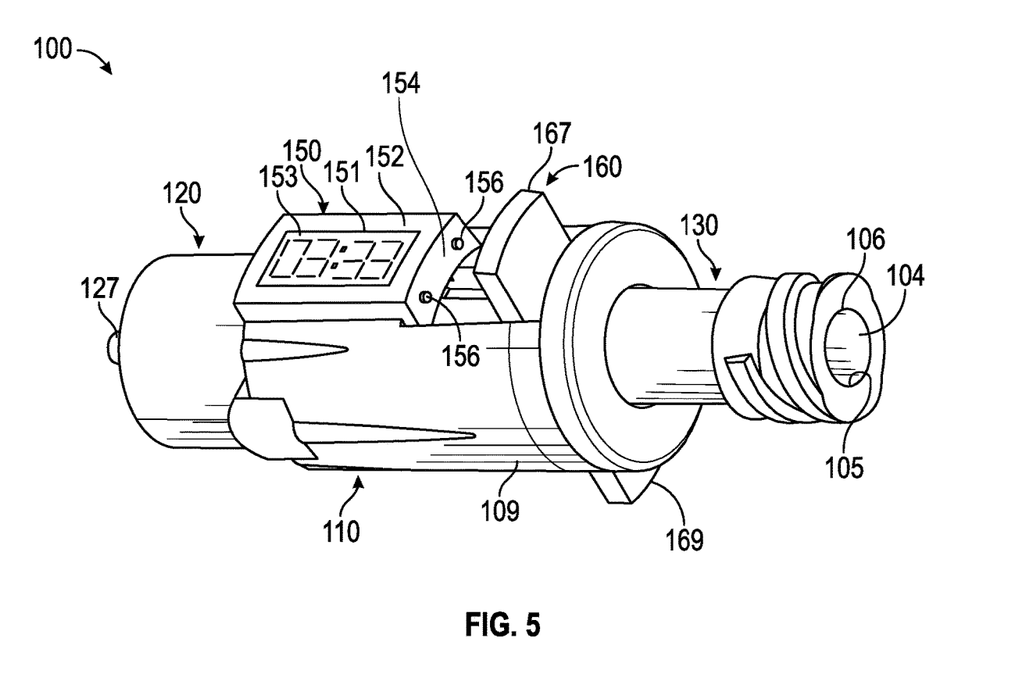
FIG. 5 illustrates a first perspective view of the connector assembly of FIG. 3, in accordance with some embodiments of the present disclosure.
Figure 6:
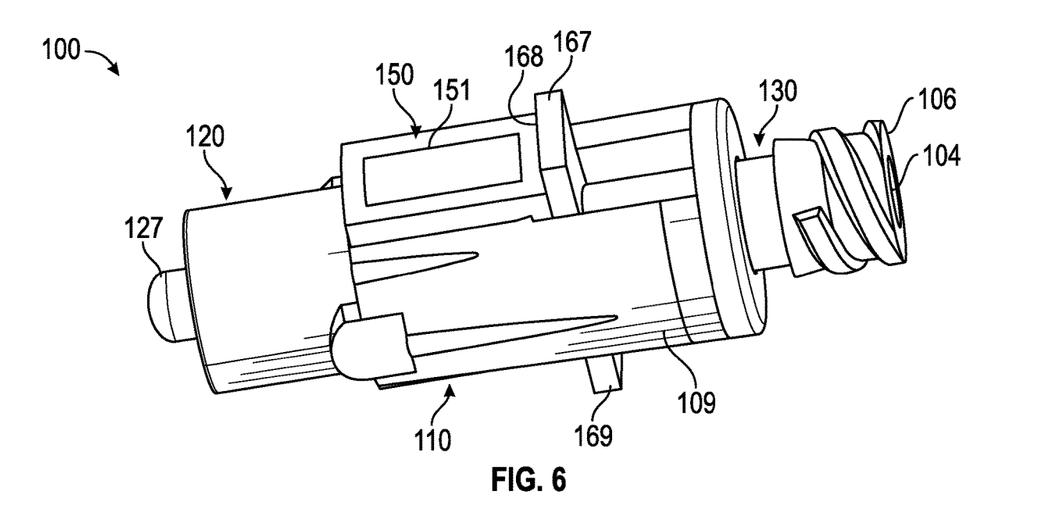
FIG. 6 illustrates a second perspective view of the connector assembly of FIG. 3, in accordance with some embodiments of the present disclosure.

FIG. 5 illustrates a first perspective view of the connector assembly 100 of FIG. 3, in accordance with some embodiments of the present disclosure. FIG. 6 illustrates a second perspective view of the connector assembly 100 of FIG. 3, in accordance with some embodiments of the present disclosure. In some embodiments, the connector assembly 100 may further include a stopwatch 150 mounted on the outer surface 109 of the cover 110. As depicted, the stopwatch may include at least one contact 156 protruding proximally from a side surface 154 of the stopwatch 150, and a display portion 151 for illustrating a timer 153 of the stopwatch 150. Although the various embodiments of the present disclosure illustrate two contacts 156, the various embodiments of the present disclosure are not limited to the aforementioned configuration. In some embodiments, the at least one contact 156 may be one contact or more than two contacts 156. In some embodiments, the stopwatch 150 may include a light and/or a buzzer indicator around an outer surface 152 of the stopwatch 150 for providing a visual and/or auditory indicator to the clinician or other medical professional that the connector assembly 100 has been disconnected from the mating connector 200. The stopwatch 150 may be a digital stopwatch having an in-built battery for providing the power supply. In some embodiments, the in-built battery may be a panel battery which may power the display 151 once the stopwatch 150 is separated from the pusher 160.

Figure 7:
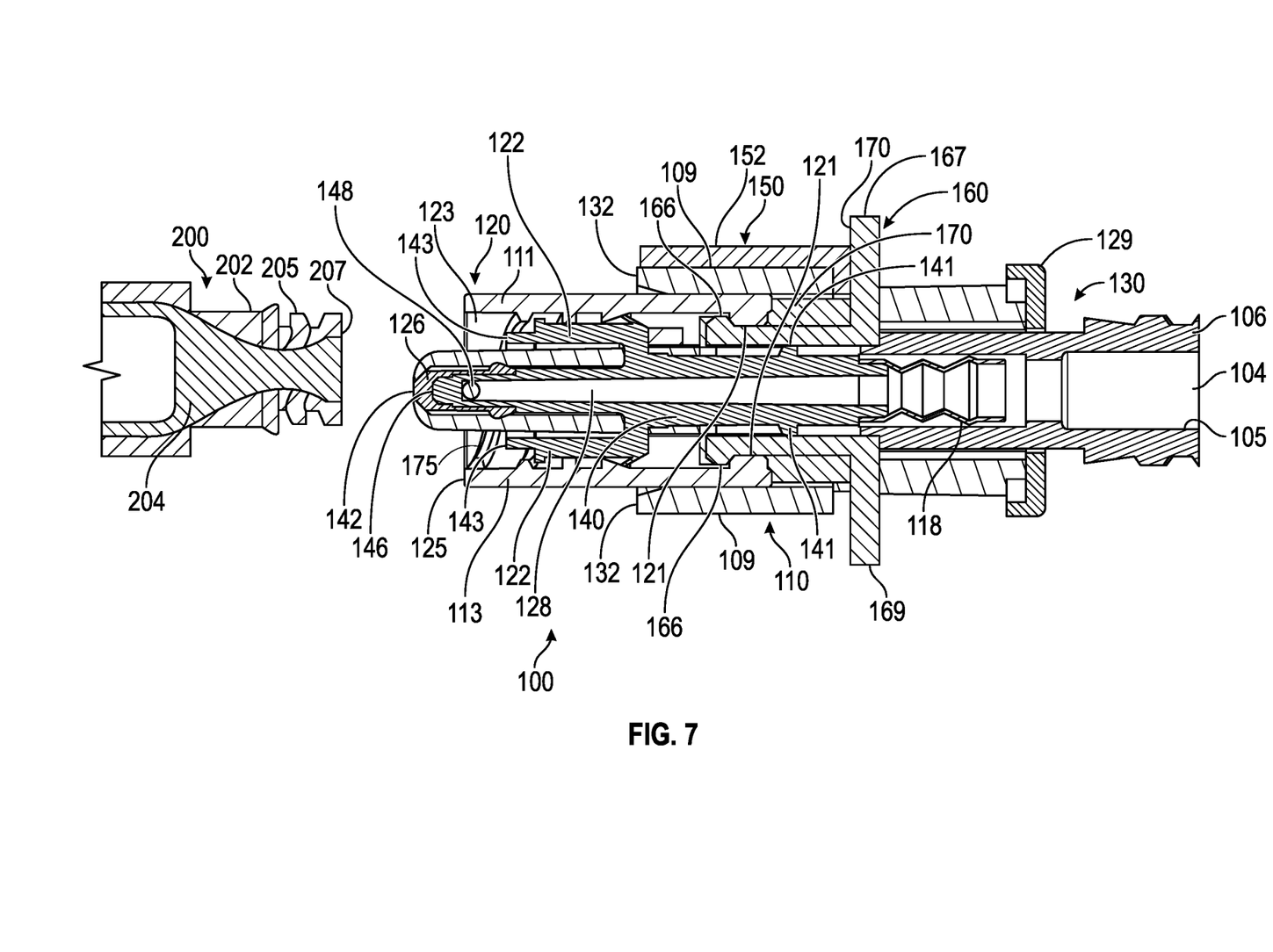
FIG. 7 illustrates a cross-sectional view of the connector assembly of FIG. 3 prior to coupling with a mating needleless connector, in accordance with some embodiments of the present disclosure.
Figure 8:
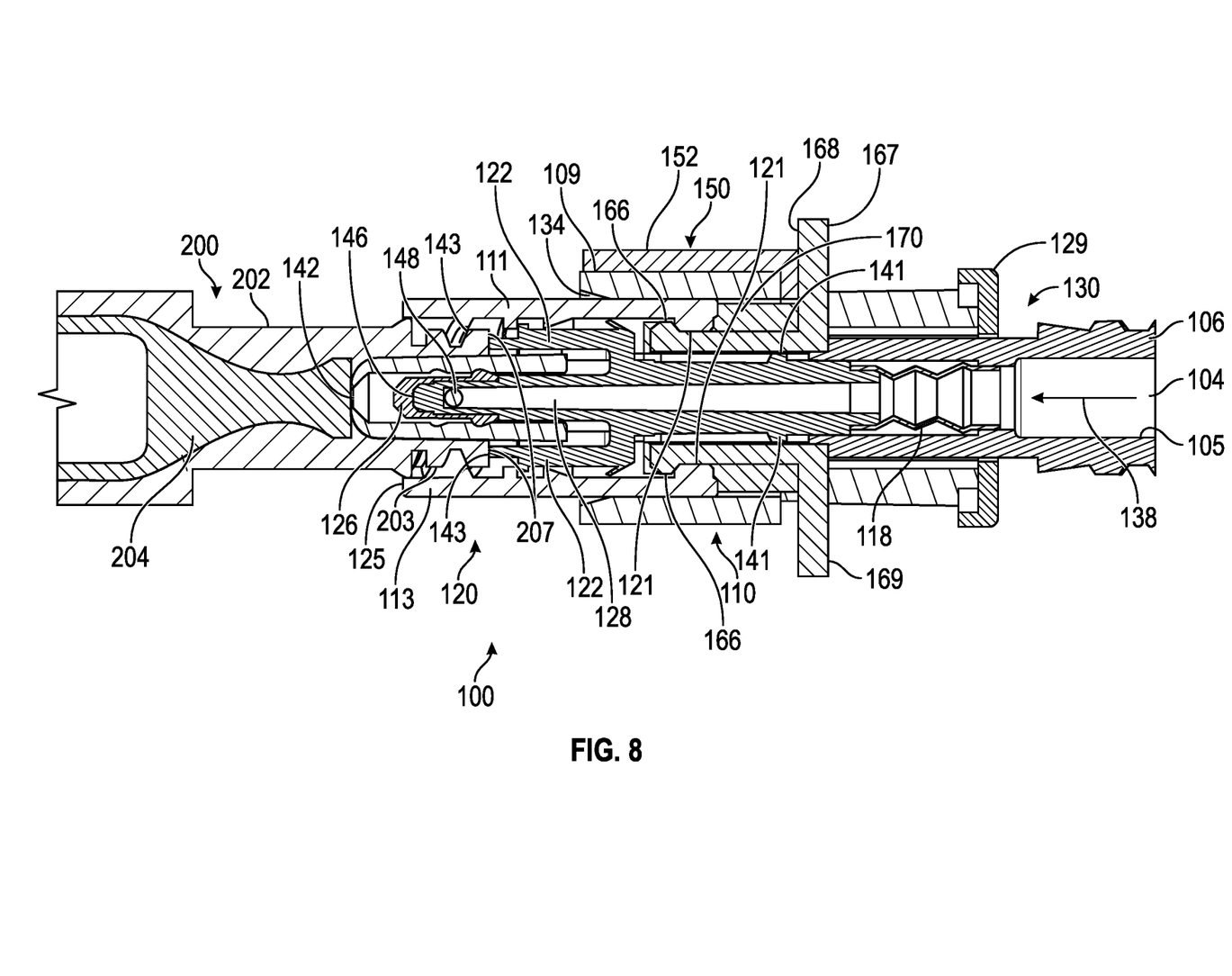
FIG. 8 illustrates a cross-sectional view of the connector assembly of FIG. 3 when coupled to a mating needleless connector, in accordance with some embodiments of the present disclosure.
Figure 9:
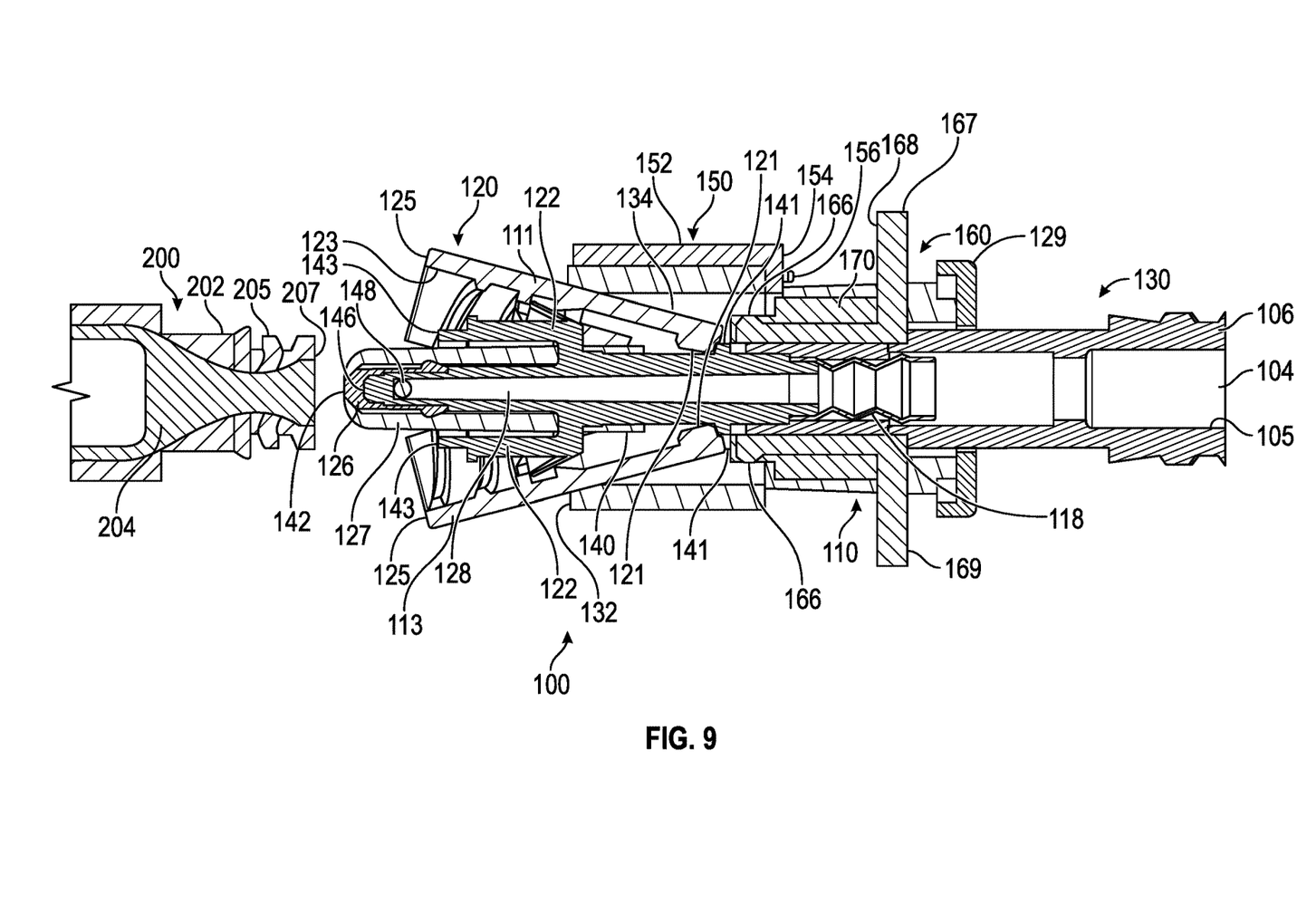
FIG. 9 illustrates a cross-sectional operational view of the connector assembly of FIG. 3 with detached mating needleless connector and distal connector pivoting open and sealing the fluid path due to the proximally-directioned force exceeding the predetermined threshold, in accordance with some embodiments of the present disclosure.

As shall be described in further detail with respect to FIGS. 7-9, when the distal connector 120 is coupled to the mating connector 200, the stopwatch 150 abuts an inner surface 168 of the first pusher leg 167 such that the at least one contact 156 is recessed within the side surface 154 of the stopwatch 150 (as illustrated in FIG. 6). Further, when a force applied to the proximal connector 130 (i.e., a proximally-directed force) exceeds the predetermined threshold causing the pusher 160 to translate proximally relative to the distal connector 120, the stopwatch 150 may be separated from the first pusher leg 167 and the at least one contact 156 may extend proximally to activate the timer 153 of the stopwatch 150. For example, when the pusher 160 translates proximally relative to the distal connector 120, the protrusions 121 of the first and second arms 111 and 113 of the distal connector 120 may slide distally along the slot before becoming fully disengaged from the pusher 160.

The connector assembly 100 of the various embodiments described herein— by incorporating a stopwatch which is activated upon releasing or otherwise decoupling from the mating connector 200—is advantageous over conventional couplers and related infusion systems in that the stopwatch allows the clinician or other medical professional do determine the exact moment/timing at which the disconnection occurred.

FIG. 7 illustrates a cross-sectional view of the connector assembly of FIG. 3 prior to coupling with a mating needleless connector, in accordance with some embodiments of the present disclosure. FIG. 8 illustrates a cross-sectional view of the connector assembly of FIG. 3 when coupled to a mating needleless connector, in accordance with some embodiments of the present disclosure. FIG. 9 illustrates a cross-sectional operational view of the connector assembly with detached mating needleless connector and distal connector pivoting open and sealing the fluid path due to the proximally-directioned force exceeding the predetermined threshold, in accordance with some embodiments of the present disclosure.

Referring to FIGS. 7-9, with continued reference to FIGS. 1 and 2, an operation of the connector assembly will be generally described. In operation, the connector assembly 100 may generally be coupled to the mating or reciprocal connector 200 at a distal end thereof and be coupled to the mating luer connector 300 at a proximal end thereof. In some embodiments, the mating or reciprocal connector 200 may be a needleless connector, and the mating luer connector 300 may be a male luer connector. For example, in some embodiments, mating connector 200 may be inserted and coupled into the open end 125 of the distal connector 120, and the mating luer connector 300 may be inserted and coupled to the inlet port 106 of the proximal connector 130. In some embodiments, the mating connector 200 may include threads 205 for mating with complimentary threads 175 in the open end 125 of the distal connector 120.

FIG. 7 illustrates the connector assembly 100 prior to coupling with the mating needleless connector 200, and FIG. 8 depicts the coupled configuration of the mating connector 200 and the distal connector 120 of the connector assembly 200 when either no force or a force below or equal to the predetermined proximal threshold force (also referred to herein as pullout force) is applied to the proximal connector 130. For example, the connector assembly 100 may be subject to proximally-directed pullout forces as a result of patients rolling over in bed, patients catching tubing or lines on bed rails, moving patients to a different bed, fidgeting by pediatric patients, and/or disoriented adult patients tugging on their lines. In some embodiments, the predetermined proximal threshold (pullout) force may be approximately 5 pounds (lbs). However, the various embodiments described herein are not limited to the aforementioned configuration, and in some instances the predetermined proximal threshold (pullout) force may be greater than or lower than 5 lbs. In some embodiment, the predetermined proximal threshold force may range from 3 lbs. to 5 lbs., and in some embodiments, the threshold force may range from 4 lbs. to 5 lbs.

According to various embodiments of the present disclosure, when subject to lower pullout forces, e.g., forces below or equal to the predetermined proximal threshold (pullout) force, the connector assembly 100 may be configured so as to retain the mating connector 200 within the distal connector 120 such that the fluid path 138 remains open and medical fluid, e.g., IV fluid may be administered from the fluid line 9 (which is fluidly connected to the primary fluid bag 10 and the secondary fluid bag 20) into the catheter 50. In particular, as illustrated in FIG. 8, when the distal connector 120 is coupled to the mating connector 200, the closed end 146 of the post 140 (along with the attached seal 126) may be displaced away from the outlet port 142 of the luer portion 127 to permit flow through the fluid path 138 via the luer portion 127.

As depicted, in the coupled configuration of the mating connector 200 and the distal connector 120, the luer portion 127 may extend through a top surface 207 of the mating connector 200 into a mating luer of the mating connector 200 to displace a flexible valve 204 of the mating connector 200. Accordingly, when the mating connector 200 is coupled to the distal connector 120, the mating connector 200 may exert a force to urge the plurality of arms 122 proximally, which in turn may compress the spring member 118, and displace the closed end 146 of the post 140 away from the outlet port 142 of the luer portion 127. For example, as illustrated in FIG. 8, the plurality of arms 122 and post 140 may be forced away from the outlet port 142 of the luer portion 127 by the top surface 207. In the open position, the closed end 146 of post 140 is displaced from the outlet port 142 of the luer portion 127, thereby permitting the medical fluid to flow between the outlet port 142 of the luer portion 127 and the lumen 128 of the post 140 through the passage 148. As previously described above, when the mating connector 200 is coupled to the distal connector 120, the plurality of protrusions 166 of the body portion engage the protrusions 121 of the first and second arms 111 and 113 to prevent distal motion of the distal connector 120 relative to the pusher 160.

FIG. 9 depicts the decoupled configuration of the mating connector 200 and the distal connector 120 of the connector assembly 100 when the force exceeding the predetermined proximal threshold (pullout) force is applied to the proximal connector 130. According to various embodiments of the present disclosure, when subject to higher pullout forces, e.g., forces exceeding the predetermined proximal threshold (pullout) force, the connector assembly 100 may be configured so as to release or otherwise decouple the mating connector 200 from within the distal connector 120 at which point the fluid path 138 may close and the medical fluid, e.g., IV fluid may be discontinued from entering the extension tubing 45 via the closed fluid path 138. As previously discussed, in some embodiments, the predetermined proximal threshold (pullout) force) may be approximately 5 pounds (lbs) For example, if the patient having the catheter 50 inserted into their skin walks away from the infusion pump or accidentally pulls on the extension tubing 45, and the force exceeds 5 lbs, the connector assembly 100 may automatically release or decouple from the mating connector 200, effectively closing the fluid path 138 connecting the patient and the primary and secondary fluid bags 10 and 20, as shall be described in further detail below. The connector assembly 100 of the various embodiments described herein—by releasing or otherwise decoupling from the mating connector 200, versus conventional couplers and related infusion systems in which the pullout force exceeding the predetermined threshold would result in dislodgement or decoupling of the actual catheter—is thereby advantageous in preventing the dislodgment of the catheter 50, potential resulting bleeding, medication leaks, as well as excessive ringing of alarms to alert a clinician of the dislodgement.

In particular, as illustrated in FIG. 9, when the force applied to the proximal connector 130 exceeds the predetermined threshold, the plurality of protrusions 166 of the body portion 161 of pusher 160 disengage from the protrusions 121 of the first and second arms 111 and 113 to allow the pusher 160 to translate proximally relative to the distal connector 120 and pivot the first and second arms 111 and 113 radially outward to decouple the mating connector 200 from the distal connector 120 as shall be described in further detail below. For example, in operation when the proximal pullout force applied to the proximal connector 130 exceeds the predetermined threshold, the pullout force causes the plurality of protrusions 166 of the body portion 161 of pusher 160 disengage from the protrusions 121 of the first and second arms 111 and 113. Upon disengagement of the first and second arms 111 and 113 from the pusher 160, the compressed spring 118 expands and exerts a force on the post 140 to displace the closed end 146 of the post 140 towards the outlet port 142 of the luer portion 127 to seal the outlet port 142, thereby closing the fluid path 138 and advantageously preventing microbial ingress into the fluid path 138. Further advantageously, the sealed outlet port 142 may prevent the medical fluid, e.g., IV fluid from further exiting or otherwise spilling out of the fluid path 38 via the outlet port 42 of the luer portion 127 upon the disconnection of the mating connector 200.

As the post 140 moves distally, the protrusions 141 on the post 140 abut and push against (i.e., exert a distal force on) the protrusions 121 of the first and second arms 111 and 113 to pivot the first and second arms 111 and 113 radially outward and widen the open end 125 of the distal connector 120 to release the mating connector 200. In addition to the compressed spring 11 expanding, upon disengagement of the first and second arms 111 and 113 from the pusher 160, the pusher 160 translates proximally relative to the distal connector 120 and the cover 110 on which the stopwatch 150 is mounted, thereby separating the stopwatch 150 from the pusher 160. In particular, as depicted in FIG. 9, the side surface 154 of the stopwatch 150 is separated from the inner surface 168 of the first leg 167 of the pusher 160, thereby allowing the contacts 156 to extend proximally or otherwise protrude outwards from the side surface 154 to activate the timer 153. Accordingly, upon pivoting radially outward of the first and second arms 111 and 113 and release, disconnection, or otherwise decoupling of the mating connector 200 from the connector assembly, the timer 153 may advantageously be activated so as to indicate a time and/or duration of time during which the disconnection occurred.

Accordingly, the first and second arms 111 and 113 may advantageously be designed to release the mating needleless connector 200 when a pull force exceeding the threshold pull force is applied to the extension tubing 45 and the proximal connector 130. As such, both the connector assembly 100 (for example, but not limited to a Texium valve) and the mating connector 200 (for example, but not limited to a Smartsite valve) may automatically shut off at separation thereby preventing (i) microbial ingress into the fluid path 138, and (2) leakage or spillage of medical fluids upon accidental disconnection by higher pullout forces exceeding the predetermined threshold force. The aforementioned configuration is advantageous over currently existing catheter dislodgement devices or couplers which may or may not be generally adhesive based, and capable of only preventing catheter dislodgement at lower pullout forces. These currently existing catheter dislodgement devices or couplers are not capable of preventing catheter dislodgement at higher pullout forces, but instead may release in response to higher pullout forces (for example forces exceeding 5 lbs.) experienced during patients rolling over in bed, patients catching tubing or lines on bed rails, moving patients to a different bed, fidgeting by pediatric patients, and/or disoriented adult patients pulling out their lines.

According to various embodiments of the present disclosure, the first and second arms 111 and 113 of the distal connector 120 may be returned from the pivoted state illustrated in FIG. 9 to the non-pivoted state illustrated in FIG. 7 by pinching together or otherwise exerting oppositely directioned forces as on the first and second arms 111 and 113 to pivot the first and second arms 111 and 113 radially inward to the original state prior to the outward pivoting.

In some embodiments, the connector assembly 100 may also be detached from the mating luer connector 200. The luer portion of the connector 300 as well as the mating connector 200 may then be swabbed or otherwise disinfected. In some embodiments, the connector assembly 100 may be discarded and replaced with a new and sterile connector assembly 100 without breaching or otherwise infecting the fluid path. The connector assembly 100 may then be coupled to the mating luer connector 300 and the mating needleless connector 200.

In some embodiments, after disinfection of the mating connector 200, the mating connector 200 may then be coupled or connected to the new sterile connector assembly 100. The mating connector 200 may then be advanced towards the luer portion 127 of the distal connector 120. As the mating connector 200 may be advanced towards the luer portion 127 of the distal connector 120, the luer portion 127 may advance into the interior of the mating connector 200 and compress the valve member 204 of the mating connector 200. As the luer portion advances further into the interior of the mating connector 200, the top surface 207 of the mating connector 200 may exert a force to urge the plurality of arms 122 proximally, which in turn may compress the spring member 118, and displace the closed end 146 of the post 140 away from the outlet port 142 of the luer portion 127, as illustrated in FIG. 8. For example, the plurality of arms 122 and post 140 may be forced away from the outlet port 142 of the luer portion 127 by the top surface 207. In the open position, the closed end 146 of post 140 is displaced from the outlet port 142 of the luer portion 127, thereby opening the fluid path 138, and permitting the medical fluid to flow through the outlet port 142 of the luer portion 127 and into the mating connector 200 via the lumen 128 and the passage 148 of the post 140. Accordingly, administration of the IV fluid from the fluid line 9 to the catheter 50 via the new sterile connector assembly 100.

According to various embodiments of the present disclosure, when subject to lower pullout forces, e.g., forces below or equal to the predetermined proximal threshold (pullout) force, the connector assembly 100 may be configured so as to retain the mating connector 200 within the distal connector 120 such that the fluid path 138 remains open and medical fluid, e.g., IV fluid may be administered from the fluid line 9 (which is fluidly connected to a fluid bags 10 and 20) into the catheter 50. In particular, when the distal connector 120 is coupled to the mating connector 200, the closed end 146 of the post 140 (along with the attached seal 126) may be displaced away from the outlet port 142 of the luer portion 127 to permit flow through the fluid path 138 via the luer portion 127.

Illustration of Subject Technology as Clauses

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1 or clause 5. The other clauses can be presented in a similar manner.

Clause 1. A connector assembly, comprising: a cover having an inner surface defining a cavity terminating in an open end of the cover, and a luer portion extending in the cavity and through the open end; a proximal connector disposed at least partially in the cavity of the cover, and defining an inlet port and having an inner surface defining a cavity of the proximal connector; a pusher mounted on the proximal connector and comprising: a body portion including an outer surface, a proximal end, and a distal end; first and second pusher legs extending radially outward from opposing sides of the body portion at the proximal end of the body portion; a distal connector at least partially disposed in the cavity of the cover; and a stopwatch mounted on the outer surface of the cover and including at least one contact, wherein: when the distal connector is coupled to a mating connector, the stopwatch abuts the first pusher leg such that the at least one contact is recessed within the stopwatch; and when a force applied to the proximal connector exceeds a predetermined threshold causing the pusher to translate proximally relative to the distal connector, the stopwatch is separated from the first pusher leg and the at least one contact extends proximally to activate a timer of the stopwatch.

Clause 2. The connector assembly of Clause 1, wherein the distal connector comprises: first and second arms disposed in the cavity of the cover and extending through the open end of the cover, the first and second arms pivotably coupled to each other and slidably coupled to the pusher.

Clause 3. The connector assembly of Clause 2, wherein the body portion of the pusher further comprises a plurality of protrusions extending radially outward from the distal end of the body portion, and a proximal end portion of each of the first and second arms comprises a protrusion, and wherein when the distal connector is coupled to the mating connector, the plurality of protrusions of the body portion engage the protrusions of the first and second arms to prevent distal motion of the distal connector relative to the pusher.

Clause 4. The connector assembly of Clause 3, wherein when the force applied to the proximal connector exceeds the predetermined threshold, the plurality of protrusions of the body portion disengage the protrusions of the first and second arms to allow the pusher to translate proximally relative to the distal connector and allow the first and second arms to pivot radially outward to decouple the mating connector from the distal connector.

Clause 5. The connector assembly of Clause 3, wherein an outer surface of the body portion of the pusher comprises a plurality of slots recessed at least partially therein, each slot extending distally from a respective one of the first and second pusher legs to a respective one of the protrusions at the distal end of the body portion, wherein when the force exceeding the predetermined threshold is applied to the proximal connector and the pusher translates proximally relative to the distal connector, the protrusions of the first and second arms of the distal connector slide along the slots.

Clause 6. The connector assembly of Clause 2, further comprising: a spring member mounted in the cavity of the proximal connector, wherein a fluid path extends from the inlet port through the luer portion to an outlet port of the luer portion of the cover; and a post disposed in the luer portion and extending longitudinally in the fluid path from a distal end of the spring member toward the outlet port of the luer portion.

Clause 7. The connector assembly of Clause 6, wherein when the distal connector is coupled to the mating connector a closed end of the post is displaced away from the outlet port of the luer portion to permit flow through the fluid path via the luer portion.

Clause 8. The connector assembly of Clause 7, further comprising a plurality of arms extending from the post and along an exterior of the luer portion toward the outlet port.

Clause 9. The connector assembly of Clause 8, wherein when the mating connector is coupled to the distal connector, the mating connector exerts a force to urge the plurality of arms proximally, compress the spring member, and displace the closed end of the post away from the outlet port of the luer portion.

Clause 10. The connector assembly of Clause 8, wherein when the distal connector is decoupled from the mating connector, a closed end of the post seals the outlet port of the luer portion to prevent fluid from exiting the fluid path via outlet port of the luer portion.

Clause 11. The connector assembly of Clause 10, wherein when the force applied to the proximal connector exceeds the predetermined threshold, the spring member expands and exerts a force on the post to displace the closed end of the post towards the outlet port of the luer portion to seal the outlet port.

Clause 12. The connector assembly of Clause 11, wherein the post comprises a pair of protrusions extending radially outward from opposing sides of the post, and when the force applied to the proximal connector exceeds the predetermined threshold causing the spring member to expand and exert a force on the post, the pair of protrusions abut and push against the protrusions of the first and second arms to pivot the first and second arms radially outward and widen the open end of the distal connector to release the mating connector.

Clause 13. The connector assembly of Clause 1, wherein the mating connector comprises a needleless connector.

Clause 14. A connector assembly, comprising: a cover having a proximal end, an outer surface, an inner surface defining a cavity terminating in an open end of the cover, and a luer portion extending in the cavity and through the open end; a proximal connector disposed at least partially in the cavity of the cover, and defining an inlet port and having an inner surface defining a cavity of the proximal connector, wherein a fluid path extends from the inlet port through the luer portion to an outlet port of the luer portion; a pusher mounted on the proximal connector and comprising: a body portion including an outer surface, an inner surface defining a cavity of the pusher, a proximal end, and a distal end comprising a plurality of protrusions extending radially outward from the body portion; and first and second pusher legs extending radially outward from opposing sides of the body portion at the proximal end of the body portion; and a distal connector comprising first and second arms disposed in the cavity of the cover and extending through the open end of the cover, the first and second arms pivotably coupled to each other and slidably coupled to the pusher, a proximal end portion of each of the first and second arms comprising a protrusion, wherein when a force applied to the proximal connector exceeds a predetermined threshold, the plurality of protrusions of the body portion disengage the protrusions of the first and second arms to allow the pusher to translate proximally relative to the distal connector.

Clause 15. The connector assembly of Clause 14, wherein when the distal connector is coupled to a mating connector, the protrusions of the body portion engage the protrusions of the first and second arms to prevent distal motion of the distal connector relative to the pusher, and when the force applied to the proximal connector exceeds the predetermined threshold, the first and second arms to pivot radially outward to decouple the mating connector from the distal connector.

Clause 16. The connector assembly of Clause 15, further comprising a stopwatch mounted on the outer surface of the cover, wherein when the distal connector is coupled to the mating connector, the stopwatch abuts an inner surface of the first pusher leg.

Clause 17. The connector assembly of Clause 16, wherein the stopwatch comprises at least one contact protruding proximally from a side surface of the stopwatch, wherein when the stopwatch abuts the inner surface of the first pusher leg, the at least one contact is recessed within the stopwatch.

Clause 18. The connector assembly of Clause 17, wherein the stopwatch comprises a display portion for illustrating a timer of the stopwatch, and when the force applied to the proximal connector exceeds the predetermined threshold and the pusher translates proximally relative to the distal connector, the stopwatch is separated from the pusher and the at least one contact extends proximally to activate the timer.

Clause 19. The connector assembly of Clause 16, further comprising: a spring member mounted in the cavity of the proximal connector; and a post disposed in the luer portion and extending longitudinally in the fluid path from a distal end of the spring member toward the outlet port of the luer portion.

Clause 20. The connector assembly of Clause 19, wherein when the distal connector is coupled to the mating connector a closed end of the post is displaced away from the outlet port of the luer portion to permit flow through the fluid path via the luer portion.

Clause 21. The connector assembly of Clause 20, further comprising a plurality of arms extending from the post and along an exterior of the luer portion toward the outlet port.

Clause 22. The connector assembly of Clause 21, wherein when the mating connector is coupled to the distal connector, the mating connector exerts a force to urge the plurality of arms proximally, compress the spring member, and displace the closed end of the post away from the outlet port of the luer portion.

Clause 23. The connector assembly of Clause 21, wherein when the distal connector is decoupled from the mating connector, a closed end of the post seals the outlet port of the luer portion to prevent fluid from exiting the fluid path via outlet port of the luer portion.

Clause 24. The connector assembly of Clause 23, wherein when the force applied to the proximal connector exceeds the predetermined threshold, the spring member expands and exerts a force on the post to displace the closed end of the post towards the outlet port of the luer portion to seal the outlet port.

Clause 25. The connector assembly of Clause 24, wherein the post comprises a pair of protrusions extending radially outward from opposing sides of the post, and when the force applied to the proximal connector exceeds the predetermined threshold causing the spring member to expand and exert a force on the post, the pair protrusions abut and push against the protrusions of the first and second arms to pivot the first and second arms radially outward and widen the open end of the distal connector to release the mating connector.

Clause 26. The connector assembly of Clause 14, wherein the outer surface of the body portion of the pusher comprises a plurality of slots recessed at least partially therein, each slot extending distally from a respective one of the first and second pusher legs to a respective one of the protrusions at the distal end of the body portion, wherein when the force exceeding the predetermined threshold is applied to the connector and the pusher translates proximally relative to the distal connector, the protrusions of the first and second arms of the distal connector slide along the slot.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A connector assembly, comprising:
    a cover having an inner surface defining a cavity terminating in an open end of the cover, and a luer portion extending in the cavity and through the open end;
    a proximal connector disposed at least partially in the cavity of the cover, and defining an inlet port and having an inner surface defining a cavity of the proximal connector;
    a pusher mounted on the proximal connector and comprising:

a body portion including an outer surface, a proximal end, and a distal end;

first and second pusher legs extending radially outward from opposing sides of the body portion at the proximal end of the body portion;

a distal connector at least partially disposed in the cavity of the cover; and a stopwatch mounted on the outer surface of the cover and including at least one contact, wherein:

when the distal connector is coupled to a mating connector, the stopwatch abuts the first pusher leg such that the at least one contact is recessed within the stopwatch; and when a force applied to the proximal connector exceeds a predetermined threshold causing the pusher to translate proximally relative to the distal connector, the stopwatch is separated from the first pusher leg and the at least one contact extends proximally to activate a timer of the stopwatch.

2. The connector assembly of claim 1, wherein the distal connector comprises:

first and second arms disposed in the cavity of the cover and extending through the open end of the cover, the first and second arms pivotably coupled to each other and slidably coupled to the pusher.

3. The connector assembly of claim 2, wherein the body portion of the pusher further comprises a plurality of protrusions extending radially outward from the distal end of the body portion, and a proximal end portion of each of the first and second arms comprises a protrusion, and wherein when the distal connector is coupled to the mating connector, the plurality of protrusions of the body portion engage the protrusions of the first and second arms to prevent distal motion of the distal connector relative to the pusher.

4. The connector assembly of claim 3, wherein when the force applied to the proximal connector exceeds the predetermined threshold, the plurality of protrusions of the body portion disengage the protrusions of the first and second arms to allow the pusher to translate proximally relative to the distal connector and allow the first and second arms to pivot radially outward to decouple the mating connector from the distal connector.

5. The connector assembly of claim 3, wherein an outer surface of the body portion of the pusher comprises a plurality of slots recessed at least partially therein, each slot extending distally from a respective one of the first and second pusher legs to a respective one of the protrusions at the distal end of the body portion, wherein when the force exceeding the predetermined threshold is applied to the proximal connector and the pusher translates proximally relative to the distal connector, the protrusions of the first and second arms of the distal connector slide along the slots.

6. The connector assembly of claim 2, further comprising:

a spring member mounted in the cavity of the proximal connector, wherein a fluid path extends from the inlet port through the luer portion to an outlet port of the luer portion of the cover; and a post disposed in the luer portion and extending longitudinally in the fluid path from a distal end of the spring member toward the outlet port of the luer portion.

7. The connector assembly of claim 6, wherein when the distal connector is coupled to the mating connector a closed end of the post is displaced away from the outlet port of the luer portion to permit flow through the fluid path via the luer portion.

8. The connector assembly of claim 7, further comprising a plurality of arms extending from the post and along an exterior of the luer portion toward the outlet port.

9. The connector assembly of claim 8, wherein when the mating connector is coupled to the distal connector, the mating connector exerts a force to urge the plurality of arms proximally, compress the spring member, and displace the closed end of the post away from the outlet port of the luer portion.

10. The connector assembly of claim 8, wherein when the distal connector is decoupled from the mating connector, a closed end of the post seals the outlet port of the luer portion to prevent fluid from exiting the fluid path via outlet port of the luer portion.

11. The connector assembly of claim 10, wherein when the force applied to the proximal connector exceeds the predetermined threshold, the spring member expands and exerts a force on the post to displace the closed end of the post towards the outlet port of the luer portion to seal the outlet port.

12. The connector assembly of claim 11, wherein the post comprises a pair of protrusions extending radially outward from opposing sides of the post, and when the force applied to the proximal connector exceeds the predetermined threshold causing the spring member to expand and exert a force on the post, the pair of protrusions abut and push against the protrusions of the first and second arms to pivot the first and second arms radially outward and widen the open end of the distal connector to release the mating connector.

13. The connector assembly of claim 1, wherein the mating connector comprises a needleless connector.

14. A connector assembly, comprising:

a cover having a proximal end, an outer surface, an inner surface defining a cavity terminating in an open end of the cover, and a luer portion extending in the cavity and through the open end;

a proximal connector disposed at least partially in the cavity of the cover, and defining an inlet port and having an inner surface defining a cavity of the proximal connector, wherein a fluid path extends from the inlet port through the luer portion to an outlet port of the luer portion;

a pusher mounted on the proximal connector and comprising:

a body portion including an outer surface, an inner surface defining a cavity of the pusher, a proximal end, and a distal end comprising a plurality of protrusions extending radially outward from the body portion; and first and second pusher legs extending radially outward from opposing sides of the body portion at the proximal end of the body portion; and a distal connector comprising first and second arms disposed in the cavity of the cover and extending through the open end of the cover, the first and second arms pivotably coupled to each other and slidably coupled to the pusher, a proximal end portion of each of the first and second arms comprising a protrusion, wherein when a force applied to the proximal connector exceeds a predetermined threshold, the plurality of protrusions of the body portion disengage the protrusions of the first and second arms to allow the pusher to translate proximally relative to the distal connector.

15. The connector assembly of claim 14, wherein when the distal connector is coupled to a mating connector, the protrusions of the body portion engage the protrusions of the first and second arms to prevent distal motion of the distal connector relative to the pusher, and when the force applied to the proximal connector exceeds the predetermined threshold, the first and second arms to pivot radially outward to decouple the mating connector from the distal connector.

16. The connector assembly of claim 15, further comprising a stopwatch mounted on the outer surface of the cover, wherein when the distal connector is coupled to the mating connector, the stopwatch abuts an inner surface of the first pusher leg.

17. The connector assembly of claim 16, wherein the stopwatch comprises at least one contact protruding proximally from a side surface of the stopwatch, wherein when the stopwatch abuts the inner surface of the first pusher leg, the at least one contact is recessed within the stopwatch.

18. The connector assembly of claim 17, wherein the stopwatch comprises a display portion for illustrating a timer of the stopwatch, and when the force applied to the proximal connector exceeds the predetermined threshold and the pusher translates proximally relative to the distal connector, the stopwatch is separated from the pusher and the at least one contact extends proximally to activate the timer.

19. The connector assembly of claim 16, further comprising:
 a spring member mounted in the cavity of the proximal connector; and
 a post disposed in the luer portion and extending longitudinally in the fluid path from a distal end of the spring member toward the outlet port of the luer portion.

20. The connector assembly of claim 19, wherein when the distal connector is coupled to the mating connector a closed end of the post is displaced away from the outlet port of the luer portion to permit flow through the fluid path via the luer portion.

* * * * *